Patented Mar. 17, 1953

2,631,990

UNITED STATES PATENT OFFICE 2,631,990

HALOGEN-CONTAINING RESINS STABILIZED WITH STANNANEDIOL ETHER ESTERS

Gerry P. Mack, Jackson Heights, and Ferdinand B. Savarese, Brooklyn, N. Y., assignors to Advance Solvents & Chemical Corporation, a corporation of New York No Drawing. Application March 23, 1950, Serial No. 151,524

4 Claims. (Cl. 260—45.75)

The invention relates to new organometallic tin compounds and to resins stabilized therewith.

The new compounds correspond to the formula (1)    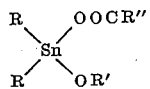

wherein R stands for an aliphatic, alicyclic, or aromatic hydrocarbon radical, OR is an alkoxy radical derived from aliphatic, alicyclic, or aromatic alcohols and R'' is the hydrocarbon residue of a monocarboxylic acid. If instead of a monocarboxylic acid a halfester of a dicarboxylic acid enters such compounds, the formula may be written (2)    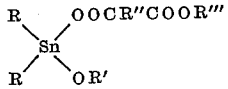

wherein R and OR' have the same significance as in Formula 1, R'' is the aliphatic or aromatic radical of the dicarboxylic acid and R''' is an alkyl, cyclic or aralkyl radical.

As readily seen from a consideration of the formulae, the new organometallic tin compounds contain a central tetravalent tin atom, two valences of which are connected to 2 aliphatic or aromatic hydrocarbon radicals, the third valence is connected to an alkoxy radical, and the fourth to a carboxylic acid. They may be designated as ether-esters of stannanediols, i. e. stannanediol derivatives in which one hydroxyl group of the stannanediol is substituted by an alkoxy radical and the other hydroxyl group by a carboxylic acid radical.

The general procedure of preparation of the new compounds consists in reacting a dialkyl or diaryl tin dihalide with an alcoholate of the alcohol which has to form the alkoxide group and with a salt of a monocarboxylic acid or of a halfester of a dicarboxylic acid, which salt should have a cation forming halides which are insoluble or difficultly soluble in the solvent, such as alkali or ammonium salts. As solvent we preferably use the anhydrous alcohol, the alcoholate of which is a component of the reaction mixture. The reaction takes place according to the following equations:

(3) $R_2SnHal_2 + MeOR' + MeOOCR'' \rightarrow$
$R_2SnOR'OOCR'' + 2MeHal$ (4) $R_2SnHal_2 + MeOR' + MeOOCR''COOR''' \rightarrow$
$R_2SnOR'OOCR''COOR''' + 2MeHal$ wherein R, R', R'', R''' have the same significance as in Formulae 1 and 2, Hal is halogen and Me is an alkali or an alkaline earth metal.

Water is undesirable during the reaction; therefore, anhydrous solvents and acids must be used and the neutralization of the carboxylic group is preferably accomplished with an alkali metal alcoholate according to the reaction $RCOOH + NaOR' \rightarrow RCOONa + ROH$ But other means of neutralization can be used as for example sodium hydride or metallic sodium or potassium.

A convenient method of preparation consists in dissolving the calculated amount of sodium metal in anhydrous alcohol and adding the carboxylic acid or the halfester to the sodium alkoxide solution under cooling to prevent saponification of the ester group. Then this solution is caused to react with the dialkyl or diaryl tin dihalide. The salt formed in the reaction is removed and the solvent distilled off under reduced pressure.

The stannanediol derivatives so obtained are soluble in most organic solvents such as alcohols, ketones, esters, aromatic hydrocarbons, also in a wide variety of plasticizers used in the compounding of vinyl resins. They may be polymerized, for instance, in the same way as described for stannanediol diesters and stannanediol diethers in our copending application, Serial No. 132,406, filed December 10, 1949, by a heat treatment in the presence of moisture, to polystannanediol derivatives, for instance ether esters of the formula (5)    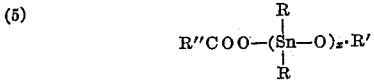

wherein R, R' and R'' have the same significance as hereinbefore and x designates the degree of polymerization.

The new compounds contain three groups which can be varied, i. e. (1) R, the hydrocarbon groups directly linked to the tin atom, which two groups may have the same or a different composition, (2) the alcohol group OR', and (3) R'', the hydrocarbon residue of the monocarboxylic acid, or the halfester residue of a dicarboxylic acid, respectively. Therefore, a very large number of such compounds can be prepared and we shall not attempt to list them all. We give, however, in the following description a selective list of reactants which may be used in reactions as defined in the Formulas 3 and 4, and we shall then describe in the examples some compounds illustrative of the new group of compounds and of their uses.

Organo-tin halides suitable for the reaction are, for instance, dimethyl, diethyl, dipropyl, dibutyl, diamyl, dihexyl, dioctyl, dilauryl, diallyl, dibenzyl, diphenyl, ditolyl, and other dichlorides or dibromides.

As the alcohol component, we can use aliphatic, cyclic, or aromatic alcohols, also ether alcohols and thioether alcohols, such as methyl alcohol, ethyl alcohol, propyl alcohol, allyl alcohol, butyl alcohol, octyl alcohol, furfuryl alcohol, tetrahydrofurfuryl alcohol, benzyl alcohol, cinnamyl alcohol, phenylethyl alcohol, methoxyethyl alcohol, ethoxyethyl alcohol, butoxyethyl alcohol, methoxyethoxyethyl alcohol, methyl hydroxyethyl sulfide, ethyl hydroxyethyl sulfide and others.

The acid component can be an aliphatic aromatic or alicyclic saturated or unsaturated monocarboxylic acid such as formic, acetic, propionic, butyric, valeric, 2-ethylhexoic, caprylic, lauric, myristic, stearic, acrylic, crotonic, oleic, linoleic, ricinoleic, sorbic, furoic, benzoic, cinnamic, phenylacetic, and other acids.

Also the halfesters of an aliphatic or aromatic dicarboxylic acid esterified with one of the alcohols as enumerated above may be employed. As dibasic acids we can use malonic, succinic, glutaric, adipic, sebacic, fumaric, maleic, itaconic, citraconic, phthalic and other acids.

Example 1

53.9 g. of lauric acid (0.25 mol) having a molecular weight of 215.6 were dissolved in 500 cc. of anhydrous methanol and neutralized with 27 g. of sodium methoxide (0.5 mol) dissolved in 250 cc. of methanol.

The resulting soap was finely dispersed in the methanol by high speed stirring and then 76 g. of dibutyl tin dichloride (0.25 mol) dissolved in 100 cc. of methanol were added to the soap-sodium methoxide solution at 25° C. and stirred until the batch was neutral. The salt formed in the reaction was filtered off and the methanol distilled off. The residual oily tin compound was purified by dissolving it in cold benzene and by filtering off the impurities, and it was recovered by removing the benzene by vacuum distillation. The obtained viscous liquid (specific gravity 1.1260; ref. index 1.4860) corresponded on the basis of its tin, methoxy and lauric acid content (found: Sn=25.0%, CH3O=6.4%, $$C_{11}H_{23}COOH=45.3\%)$$

to the formula

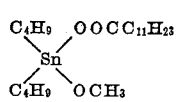

The amount of sodium chloride obtained was 29.5 g. corresponding to the theoretic amount. Dibutyltinmethoxylaurate requires theoretically 24.81% of tin, 6.5% of methoxy and 45.15% of lauric acid.

Example 2

4.6 g. of sodium metal were dissolved in 400 cc. of n. butanol, and 28.3 g. of oleic acid were added to this solution. The solution so obtained was reacted with 68.8 g. of diphenyl tin dichloride. After the completion of the reaction the salt and the excess butanol was removed; the last traces of sodium chloride were eliminated by dissolving the residue in benzene, filtering and removing the solvent. The soft waxy product obtained was diphenyltinbutoxyoleate and corresponded to the formula:

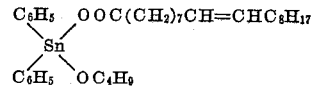

as substantiated by the tin, oleic acid and butoxy content of the compound.

Example 3

In an identical manner as described in the previous examples diethyl tin ethoxyethoxide crotonate was prepared by reacting 49.5 g. of diethyl tin dichloride with an equimolar mixture of sodium crotonate and sodium ethoxyethoxide, prepared by dissolving 4.6 g. of sodium metal in a large excess of ethylene glycol monoethyl ether, and adding 8.6 g. of crotonic acid to this solution. The salt formed in the reaction was filtered off and the excess ethyleneglycol monoethyl ether was removed by vacuum distillation. The resulting liquid product had, after purification, the formula

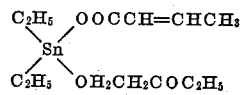

(Theory: Sn=33.82%; crotonic acid=24.52%.)
(Found: Sn=33.71%; crotonic acid=24.70%.)

Example 4

81 g. of sodium methoxide (1.5 mols) were dissolved in 750 cc. of cold methanol, and 98.6 g. of monomethyl maleate (0.75 mol) were added slowly under cooling at 0° C. The clear solution thus obtained was reacted with 227.8 g. of dibutyl tin dichloride (0.75 mol) under cooling and stirring at 0.5° C. and stirring was continued until the mixture became neutral. The salt formed in the reaction was removed by filtration; then the methanol was distilled off and the residual oil extracted with cold toluol. After distilling off the toluol, a liquid product (spec. gravity=1.3740; refr. index=1.5103) was obtained which was dibutyl tin monomethoxy methylmaleate and had the formula

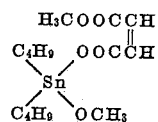

as substantiated by the analysis of the tin, methoxy and maleic acid content, (Theory: Sn=30.21%; CH3O=15.79%; maleic acid=29.54%)
(Found: Sn=30.70%; CH3O=15.83%; maleic acid=29.80%)

In an identical manner the following products were prepared:

Dibutyl tin monomethoxy butyl maleate of the formula

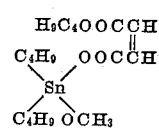

Tin required=27.29%; Found=28.09%.
Methoxy required=6.97%; Found=7.05%.
Sp. gravity=1.3250; Refr. index=1.5068.

Dibutyl tin monomethoxy allyl maleate which corresponded to the formula

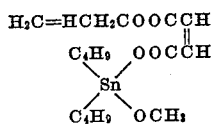

Spec. gravity=1.2910; Refr. index=1.5011.
Tin required=28.34%; Found=27.99%.
Methoxy required=7.41%; Found=7.27%.

Dibutyl tin monomethoxy tetrahydrofurfuryl maleate which had the formula

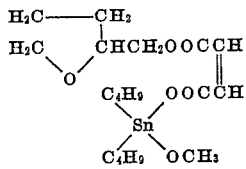

Spec. gravity=1.2730; Refr. index=1.5036.
Tin required=25.64%; Found=25.3%.
Methoxy required=6.7%; Found=6.58%.

Dibutyl tin monomethoxy methyl succinate of the formula

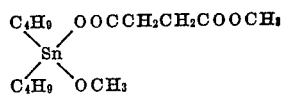

Spec. gravity=1.3500; Refr. index=1.4980.
Tin required=29.67%; Found=29.80%.
Methoxy required=15.48%; Found=15.40%.

Dibutyl tin monomethoxy methyl phthalate which had the formula

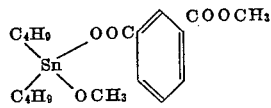

Spec. gravity=1.3700; Refr. index=1.5448.
Tin required=26.8; Found=26.7%.
Methoxy required=14.01%; Found=13.95%.

Diethyl tin monoethoxy ethyl sebacate which had the formula

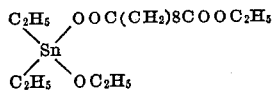

Tin required=26.3%; Found=26.0%.

Diphenyl tin monomethoxy butyl itaconate having the formula

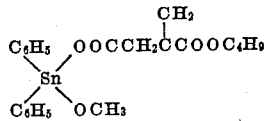

Tin required=24.26%; Found=24.50%.
Methoxy required=6.35%; Found=6.22%.

The new compounds are excellent stabilizers to protect halogen-containing resins against deterioration and discoloration due to the influence of heat and light. They are superior to most known tin stabilizers, particularly to monomeric stannanediol diesters and diethers, because of their low volatility and their resistance against hydrolysis. In addition, they may be readily and economically prepared. They are fully compatible with said resins when they are incorporated in such amounts that 0.1 to 5 per cent, preferably 0.3 to 3 per cent, of tin by weight of the halogen-containing resins is employed. They may also be used in combination with other organo-metallic tin and/or with tin-free stabilizers. They may be added prior to, during, or after polymerization of the halogen-containing resinous compositions and are preferably incorporated in the polymerized composition before compounding it in the rubber mill.

Halogen-containing resins, which are rendered heat and light resistant by the compounds of this invention, are, for instance, polymers of vinyl chloride and vinyl resins containing vinyl chloride units in their structure, such as copolymers of vinyl chloride with vinyl esters of aliphatic carboxylic acids, particularly vinyl acetate; copolymers of vinyl chloride with esters, nitriles and amides of unsaturated carboxylic acids, e. g. of acrylic and methacrylic acid; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

The stabilizers can be used with most of the well-known plasticizers for these resins, for instance, the phthalate esters, adipates, phosphates and ricinoleates. Alcohol esters of unsaturated fatty acids are particularly useful for use with such tin salt stabilizers as they seem to exercise a synergistic effect on these materials and give even greater heat and light stability. It is only necessary to employ small amounts of such esters, say 5 to 10% of the plasticizers used in the compound.

The following examples illustrate the use of the new compounds as stabilizers.

*Example 5*

1.5 g. of dibutyl tin monomethoxy methylmaleate as obtained according to Example 4 were dissolved in 35 g. of di 2-ethylhexyl phthalate. This solution was mixed with 65 g. of a vinyl chloride-vinyl acetate copolymer resin containing 95 per cent of vinyl chloride and 5 per cent of vinyl acetate and the composition was then milled on a two roll rubber mill for 10 minutes at 315–325° F.; the plastic mass so obtained was heat pressed between polished steel plates at 325° F. for five minutes to a film which was then baked in an air circulating oven at 340° F. for periods of 30, 40, 60, and 75 minutes together with identical films containing no stabilizer and other films containing 1.5 g. of dibutyl tin acetate. The samples containing no stabilizer were dark brown already after 30 minutes. The samples containing dibutyl tin diacetate started to yellow slightly after 30 minutes and were dark yellow after 45 minutes. The samples containing the dibutyl tin methoxy methyl maleate were still colorless after 60 minutes and only very slightly yellowish after 75 minutes.

Example 6

3 g. of dibutyl tin methoxy laurate were added to a mixture of 100 g. of vinyl chloride resin and 50 g. of dioctyl phthalate plasticizer and milled continuously on a rubber mill until a noticeable discoloration started which appeared after 65 minutes of milling at 310–320° F. An identical mix containing no stabilizer became brownish yellow already after 10 minutes of milling. When a third film using the same formula but containing 3 g. of dibutyl tin laurate was milled, a definite yellowing of the film was noticeable after 30 minutes.

The excellent stabilizing properties of the stannanediol ether-esters of this invention are maintained when these compounds are used in the polymeric state.

In the copending applications, Serial No. 29,935, filed May 28, 1948, and Serial No. 57,425 (now Patent No. 2,592,926), filed October 29, 1948, by Gerry P. Mack and Emery Parker, it has been pointed out that organo-metallic tin compounds containing a plurality of R₂SnO groups linked to each other through their oxygen atoms, are good stabilizers for halogen-containing resins. A consideration of Formula 5, hereinabove, shows that the polystannanediol ether esters of this invention are compounds containing a plurality of R₂SnO groups.

In another copending application, Serial No. 132,406, filed by the same inventors on December 10, 1949, it has been disclosed and claimed that good stabilizers are represented by polystannanediols in which at least one, preferably both, of the hydroxyl groups are substituted by an organic group which renders the compounds compatible with halogen-containing resins. In said application, carboxylic acid esters of polystannanediols are specifically disclosed as members of that class while polystannanediol ethers are the principal subject of the prior applications, Serial Nos. 29,935 and 57,425 (now Patent No. 2,592,926).

The new polystannanediol ether esters are polystannanediol derivatives in which one hydroxyl group has been substituted by an alcohol radical and the other hydroxyl group by a carboxylic acid radical. Their stabilizing properties are illustrated by the following example:

Example 7

27.0 g. of sodium methoxide and 41.0 of anhydrous sodium acetate in the form of a fine powder were slurried in 500 cc. of dry benzene. 303.8 g. of dibutyl tin dichloride dissolved in 250 cc. of dry benzene were dropped in under vigorous stirring and cooling at 10–20° C. Stirring was continued for several hours after the addition was completed, until a filtered sample did not contain chlorine. The sodium chloride was filtered off and the benzene distilled off under reduced pressure at 20–30° C. The remaining colorless liquid corresponded to the formula:

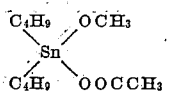

which requires:

Sn=36.75%; Found 36.70%.
CH₃O=9.62%; Found 9.53%.
CH₃COOH=19.2%; Found 19.05%.

50 g. of this dibutyl tin methoxy acetate were placed in a flask and moist air was blown through the liquid at 95–100° C. and the gases were condensed. The condensate contained methanol and acetic acid; the liquid residue solidified on cooling to a waxy solid easily soluble in organic solvents. According to the analysis of this solid, it had the formula:

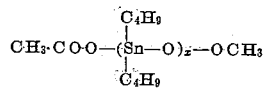

whereby $x$ was approximately 3 as its tin content was 42.2%, methoxy content 3.52%, acetic acid— 7.26%; a polymer having $x=3$ requires Sn=42.4%, methoxy=3.61% and acetic acid=7.15%.

0.5 part of the polymeric dibutyl tin methoxy acetate was incorporated in a mixture of plasticizers consisting of: 15 parts of tetrahydrofurfuryl oleate, 15 parts of diphenyl octyl phosphate, and 20 parts of dioctyl phthalate, which was added to 100 parts of a polyvinyl chloride resin. The mix was milled on a rubber mill for 30 minutes. The film so obtained was very pale yellow, whereas an identical mix containing no stabilizer was reddish brown; another containing only dibutyl tin diacetate was dark yellow and had a strong odor of acetic acid, which also was given off during milling.

By varying the alkoxy groups and the fatty acid groups, a variety of polystannanediol derivatives can be obtained whereby the nature of the end groups will be determined by the higher or lower volatility with steam of the alkoxy or fatty acid groups in the starting material.

The following example illustrates the preparation of a polystannanediol diester from a stannanediol ether ester.

Example 8

Dibutyl tin monomethoxy methylmaleate as obtained according to the procedure described in Example 4 was subjected to a steam distillation by blowing in moist air at 95–98° C. Methanol was driven off and the solid residue remaining in the distillation flask was an anhydrobis dibutyl stannanediol dimethyl maleate of the formula:

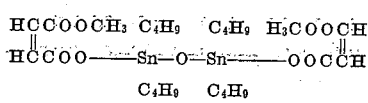

The very viscous liquid product had a spec. grav. 1.4150, Refr. index 1.5191, and a tin content of 32.57%, methoxy content of 8.2%, maleic acid content of 32.0%. Theory for a dimer:

32.1% tin
8.39% methoxy
32.4% maleic acid 1 part of this compound was added to 100 parts of a vinyl chloride diethyl maleate copolymer resin mixed with a mixture of plasticizers containing 15 parts of tetrahydrofurfuryl-oleate, 15 parts of dibutyl tetrachlorphthalate and 10 parts of di 2-ethylhexyl phthalate and milled on a rubber mill for 10 minutes at 320° F. The plastic mass was then heat-pressed between polished steel plates at 325° F. for various lengths of time and the discoloration of the pressed films was compared with identical films containing no stabilizer by measuring the extinction coefficients of the films. The results were:

Extinction coefficient after:

|  | 10 min. | 20 min. | 30 min. | 45 min. |
|---|---|---|---|---|
| Non-stabilized | 1.2 | 1.8 | 2.7 | 4.5 |
| Stabilized | 0.3 | 0.4 | 0.45 | 0.6 |

The expressions "alcohol residue" and "alkoxy radical" used in the specification and claims mean the residue obtained by removing the hydrogen atom from the hydroxyl group of the specified alcohol.

Various modifications of the invention, other than specifically described herein, will be evident and are included within the scope of the appended claims.

What we claim is:

1. A heat and light resistant plastic composition including as a major constituent a halogen-containing resin and as a stabilizer and organo-substituted stannanediol ether ester of the formula

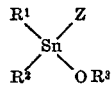

wherein $R^1$ and $R^2$ are organic groups selected from the class consisting of alkyl, aryl, and aralkyl radicals, $OR^3$ is an alkoxy radical, and Z is a carboxylic acid radical derived from a member of the group consisting of monocarboxylic acids and halfesters of dicarboxylic acids.

2. A heat and light resistant plastic composition including as a major constituent a halogen-containing resin and as a stabilizer a polystannanediol compound prepared by the poly condensation of an organo-substituted stannanediol ether ester as defined in claim 1.

3. A composition containing a vinyl resin including polyvinyl chloride and a heat stabilizer comprising a dialkyl tin monoalkoxy alkyl maleate of the formula

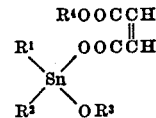

wherein $R^1$ and $R^2$ represent alkyl radicals and $R^3$ and $R^4$ are monovalent aliphatic hydrocarbon radicals.

4. A composition containing a vinyl resin including polyvinyl chloride and a heat stabilizer wherein the stabilizer comprises dibutyl tin monomethoxy methylmaleate.

GERRY P. MACK.
FERDINAND B. SAVARESE.

REFERENCES CITED

The following references are of record in the file of this patent:

UNITED STATES PATENTS

| Number | Name | Date |
|---|---|---|
| 2,047,191 | Buc et al. | July 14, 1936 |
| 2,252,665 | Reiff et al. | Aug. 12, 1941 |
| 2,431,038 | Harris | Nov. 18, 1947 |
| 2,455,613 | Schlattman | Dec. 7, 1948 |
| 2,479,918 | Fincke et al. | Aug. 23, 1949 |